are withdrawn so far as to expose recess 86. The requisite thickness of spacing strips 106 is inserted, and upon this, film side up, the negative or other original to be copied is laid. As stated above, this negative should be just flush with the inner face of baseplate 74. Plate 85 is taken out of the instrument, as can readily be done by drawing frame 84 out sufficiently, and a sensitized plate 87 is fastened down in recess 86 by means of screws 88 and clamps 89 (Fig. 16). This operation must of course be performed in a "dark room." The film side of this plate should be turned outward, and should be made just flush with the outer surface of plate 85. This is readily done by placing a piece of cardboard and several thicknesses of paper, as occasion may require, into recess 86, behind plate 87. Plate 85 thus charged is then introduced into the instrument as shown in Fig. 16, and thumbscrews 94, 98 are screwed in. The instrument is now placed with the opening 75 turned toward a source of light, and by working lazy-tongs 92 by opening out the handles (not shown), plate 85 containing sensitized plate 87 is caused to travel from left to right (referring to the arrangement of parts displayed in Figs. 14 and 16), while frame 84, and with it slit 91, travels from right to left, its final position being shown in dotted lines in Fig. 14. In the drawing the dimensions are chosen to represent an instrument which will receive a negative measuring 3¼x4¼ inches, and a sensitive plate measuring 4¼x6½ inches; in such a case plate 87 moves 3¼ inches (or a little in excess of this) to the right, and slit 91 moves an equal distance to the left, the several limbs of lazy-tongs 92 being all of equal length. But different dimensions may be chosen, and the requisite motion, if unequal, of plate 87 and slit 91 may be obtained by suitably adjusting the length of the limbs of the lazy-tongs. In any case however the original and copy will have one dimension in common.

The development of plate 87 is effected as usual, and thus a distorted copy is obtained. From this a rectified copy can be obtained in a manner similar to that described in connection with the apparatus shown in Figs. 5 to 13. For this purpose a second separate apparatus similar to that shown in Figs. 14 to 16, but of correspondingly increased dimensions may be used, or, what is more expedient, one such apparatus with a set of adapters of suitable size may be employed for both the first and the second operation. This does not require any detailed description.

In Fig. 17 there is shown diagrammatically a form of apparatus suitable for carrying out my process with photographic films mounted upon a celluloid or similar flexible base. The apparatus consists of a closed box or chamber 110 in one wall of which is provided a narrow slit 111. The film 112 to be copied is wound up on a reel 113, and its end is passed between feed rollers 114, 115, made of yielding material, and pressed together by any suitable means. The free end of film 112 is taken in close proximity past the slit 111 and between feed rollers 116, 117, and attached to the winding reel 118. A sensitized film 119 is similarly unwound from a reel 120 through feed rollers 121, 122 and 123, 124, and wound on a reel 125, film 112 facing with its celluloid side outward toward the slit, and film 119 facing with its sensitive emulsion side in contact with the emulsion side of film 112. To insure proper contact a yielding roller 126 is preferably provided. To operate this apparatus the feed rollers are rotated by any suitable means each at a definite speed. If the speed of the two films is the same a simple unaltered copy is obtained. This may be taken advantage of in copying for example cinematograph films. If however film 119 moves faster than film 112, a drawnout copy is obtained, or if 119 moves more slowly than 112 a foreshortened copy is obtained, i. e. one in which lines parallel to the slit are copied unaltered, but lines at right angles to the same are shortened. It is of course necessary, in case the films employed are narrower than the breadth of the slit, to cover up the free portions of the slit.

The drawn out copy obtained as described above may be subjected to a second operation resembling the above, but so performed that the second lengthening is at right angles to the first. For this purpose, the film is wound on the reel 113 in a position at right angles to that which it occupied during the first operation. That is to say, the edge of the film which previously was arranged parallel to the axis of the reel, is now coiled transversely upon the reel, and vice versa. In a number of cases, the reel will be long enough to accommodate the film in either position; when such is not the case, simple expedients, such as will occur to any skilled mechanic, will be adopted to enable the film to be wound on the reel in the desired manner. The result of the second operation is an undistorted copy, on enlarged scale, of the original. If the original was a negative, this copy will be a negative, and any number of prints can be prepared therefrom by any of the known methods. Similarly from the foreshortened copy, copies on a reduced scale may be obtained.

Having thus set forth the nature of my invention, I wish it to be clearly understood that I do not limit myself to the details of process and apparatus herein described by

UNITED STATES PATENT OFFICE.

CHESTER E. McGOWAN, OF MEMPHIS, TENNESSEE.

STORE-FRONT CONSTRUCTION.

1,176,385.

Specification of Letters Patent.

Patented Mar. 21, 1916.

Application filed June 5, 1915. Serial No. 32,377.

*To all whom it may concern:*

Be it known that I, CHESTER E. McGOWAN, a citizen of the United States, residing at Memphis, in the county of Shelby and State of Tennessee, have invented certain new and useful Improvements in Store-Front Construction, of which the following is a specification.

My present invention pertains to an improved store-front construction, and more particularly to that class wherein metallic members are employed to embrace and hold the contiguous edges of glass plates in place.

The invention is illustrated in the annexed drawings wherein—

Figure 1 is a sectional perspective view of one form or embodiment of the invention; Fig. 2 a vertical sectional view; Fig. 3 a horizontal section taken on the line 3—3 of Fig. 2; Fig. 4 a like view illustrating a modification of the invention; and Fig. 5 a perspective view of the draw bar or member shown in Fig. 4.

The main object of the present invention is to provide a simple and efficient structure which may be readily formed and assembled, and which, while presenting a neat and finished appearance is at once light and strong, free from solder or brazed joints, and readily positioned.

A further object resides in the provision of a vertically disposed channel bar, formed of steel or iron, and adapted to relieve the window panes or lights of the weight of the window roof, said bar being inclosed by the inner or back member of the clamping structure and being invisible.

A still further object of the invention is to produce a structure which will have more or less yield, give or spring, whereby expansion will be taken care of and the margin or edges of the glass plates will be relieved of strain.

With these and other objects in view, reference will be first made to the construction disclosed in Figs. 1 to 3 inclusive. In said figures, 1 denotes the ceiling or roof of the front, 2 the floor, and 3 and 4 the contiguous window panes or plates, which in the present instance are shown in the same plane, though obviously they might be placed at an angle to each other by merely changing the angularity of the clamping elements or members of the structure. The mullion or front clamping and division member is preferably composed of two plates or sheets of metal which are rolled to form, the inner member throughout its major portion being nested within the outer member, said members having respectively semi-circular head sections 5 and 5ª, body sections 6 and 6ª, and laterally projecting flanges 7 and 7ª, the former taking against the outer faces of the panes 3 and 4. In practice the inner element or filler member, as it may be termed, will preferably be made of heavier stock than the outer member, and the flanges 7ª will be made narrower than flanges 7. Thus the body portion and head of the division bar or mullion are relatively strong and rigid as is also the central portion of the outer flanged portion, while the ends of the flanges 7 which bear directly upon the plates 3 and 4 are relatively light. The filler piece may be made of one kind of metal and the outer one of a different contrasting metal thus producing a pleasing color effect. Moreover, by having the flanges of different widths a beading is provided. Secured within the head of the mullion is a plurality of draw bars 8, the bars in the present instance being semi-circular in cross section and being closely embraced by the head section 5ª. The ends 9 of the bars, (except the extreme ends of the upper and lowermost bars) are bent at right angles to the body of the bar and extend through openings 10 formed in the head. The flat faces of said ends contact and form in effect a rounded bolt the outer faces being of course threaded. Intermediate said threaded portion and the head 5 of the mullion, the ends are bowed or spread apart as at 11 to insure more or less resiliency or yieldability in the structure, a very desirable feature. This bowing may be effected before the bars are incased in which event the openings 10 are elongated to facilitate the positioning of the bars, or the bowing may be effected after the bar is secured in the head 5, in which case the openings 10 will conform to the cross section of the ends 9. The back piece or member will preferably be of the form best understood upon reference to Figs. 1 and 3. It may be said to comprise a back plate 12 and side plates 13 with laterally extending forwardly inclined bearing members 14 which as will be noted contact with the plates 3 and 4 at a point remote from the edges of said plates. This arrangement permits of yield under strain or pressure and compensates for expansion copy made therefrom and of a different size, and means for holding a blank sensitive to the copying agent, in operative relation to said two members.

21. In a device of the character described, a member provided with a portion for allowing the passage of a copying agent, another member movable relatively to said first-named member and provided with means for holding adjacent to said portion, articles of two different sizes, said sizes having one dimension in common, and means for holding a blank sensitive to the copying agent, in operative relation to said two members.

In testimony whereof, I have signed my name to this specification in the presence of two subscribing witnesses.

ALFRED J. LOTKA.

Witnesses:
 ORIN TUGMAN,
 E. C. CRITTENDEN.

sections extending outwardly from the body of the bar and being threaded; and a sheet of metal folded upon itself and embracing said bar, said sheet extending forwardly from the bar and having its marginal portions bent laterally in opposite directions forming flanges.

7. A mullion comprising a draw bar formed from a plurality of sections of half round metal stock, the adjacent ends of the sections extending laterally from the body and each end being provided with a bowed portion between its extremity and the body; and a sheet metal division and clamping member embracing said sections.

8. A store front construction comprising in combination a mullion having a pair of flanges adapted to contact with the outer face of two adjacent panes of glass and a division section extending rearwardly therefrom; a draw bar secured to said division member and provided with outwardly extending arms; an independent weight sustaining member having openings through which said arms may pass freely; a clamping member also provided with openings for said arms, said clamping member extending forwardly toward the mullion flanges and housing the weight sustaining member; and nuts mounted on the arms and bearing against the rear face of the clamping member, the mullion and clamping member being susceptible of adjustment independently of any movement of the weight-sustaining member.

9. A store front structure comprising in combination a roof; a floor; a substantially U shaped channel member extending from the floor to the roof and secured thereto; a pair of plates of glass; a mullion having flanges contacting with said plates and extending inwardly between the same; a draw bar secured to said mullion, said bar having members extending rearwardly and through openings formed in the channel member; a substantially U-shaped clamping member housing the channel member and contacting at its forward edges with the plates, said clamping member likewise having openings formed therein for the passage of the rearwardly-extending members of the draw-bar, the clamping member and the mullion being susceptible of relative movement for adjustment independently of any movement of the channel member; and nuts mounted on said rearwardly-extending members and bearing on the clamping member.

10. A mullion substantially T-shaped in cross-section, comprising a plurality of nested metallic sheets bent to form and embracing at the foot of the T, where the sheets are folded, a metallic draw bar having laterally-projecting fastening elements.

11. A store front construction, comprising in combination, a mullion adapted to contact with the outer face of two adjacent plates of glass and a division section extending rearwardly therefrom between the edges of the plates; means for maintaining said mullion in place; and a weight-sustaining member, interposed between said means and the forward pane-contacting section of the mullion and adapted to be secured at its upper and lower ends, the mullion and the means for securing the mullion in place, being relatively adjustable to clamp the plates independently of any adjustment or movement of the weight-sustaining member.

In testimony whereof I have signed my name to this specification.

CHESTER E. McGOWAN.

Copies of this patent may be obtained for five cents each, by addressing the "Commissioner of Patents, Washington, D. C."